United States Patent [19]
Celesti

[11] 3,856,256
[45] Dec. 24, 1974

[54] INJECTION MOLD FOR MAKING HOLLOW BODIES HAVING A MOLD LOCKING CORE

[75] Inventor: Louis Emile Celesti, Sonnaz (Chambery), France

[73] Assignee: Cincinnati Milacron Inc., Cincinnati, Ohio

[22] Filed: Mar. 14, 1973

[21] Appl. No.: 341,045

[30] Foreign Application Priority Data
Mar. 22, 1972 France .............................. 72.10742

[52] U.S. Cl.................... 249/66, 249/152, 249/184, 425/450 C, 425/249, 425/438
[51] Int. Cl............................ B29c 1/14, B29f 1/14
[58] Field of Search........ 425/438, 450 C, 119, 249, 425/443, 441, 468, DIG. 5; 249/152, 151, 66–68, 147, 175, 177, 178, 180, 184; 164/340

[56] References Cited
UNITED STATES PATENTS

| | | |
|---|---|---|
| 1,463,247 | 7/1923 | Brand ................................ 249/151 |
| 2,875,472 | 3/1959 | Marcus ............................. 249/66 C |
| 3,373,460 | 3/1968 | Ladney, Jr. ...................... 249/152 X |
| 3,618,170 | 11/1971 | Owens ............................. 249/184 X |

*Primary Examiner*—Francis S. Husar
*Assistant Examiner*—David S. Safran

[57] ABSTRACT

Apparatus for injection molding hollow bodies open at both ends in a two-part mold adapted to separate at the largest section of the body between the two ends thereof. A two-part core divided along a slanted line is supported in the mold at each end and one part of the core is arranged to be locked to one mold part in the closed position of the mold and to be released therefrom only after the core parts have been separated upon opening of the mold. Separation of the core parts is effected by a lost-motion connection between each of these parts and the other mold part which causes the core parts to be forcibly separated when the mold is opened thereby stripping the molded body from the core.

5 Claims, 2 Drawing Figures

INJECTION MOLD FOR MAKING HOLLOW BODIES HAVING A MOLD LOCKING CORE

BACKGROUND OF THE INVENTION

This invention relates to the molding of hollow bodies open at both ends such as bladders used in the fabrication of pneumatic tires.

At the present time the most common method of producing the bladders used in tire manufacturing operations is by a compression molding technique using a mold formed of two parts and a single piece core. In this process, a sheet of material having a volume equal to one-half of the volume of the part to be molded is placed in the bottom half of the mold. The core is then set in place by hand and is covered with another sheet of material of the same volume as the first one. The mold is then closed and heat is applied to complete the molding operation. However, the time required to mold parts by this process is quite long and may run to as much as twenty minutes for large size parts.

Another technique which has been used consists of injecting the molding material into one end of the mold and thereafter extracting the core with the bladder formed around it.

In both of the above-mentioned methods, it is necessary to exert considerable stress on the bladder to free it from the core over which it has been formed. This requires additional time and must be carefully done in order to avoid tearing the bladder.

SUMMARY OF THE INVENTION

The present invention relates to a new and improved form of injection molding apparatus which significantly reduces the time required to mold bladders of the type described as well as facilitating the removal of the bladders from the core. In the new arrangement, a two-part mold is adapted to separate at the point of maximum girth of the body between the open ends thereof. Inside the mold is arranged a core which is divided into two parts along a line that is slanted with respect to the longitudinal axis of the core. The part of the core having the largest base portion is adapted to be locked to the mold part against which the base portion seats. This is effected by a rocking latch pivoted on the core part and adapted to engage an abutment on the mold part. The latch is normally biased to its released position but is provided with a tail adapted to be engaged by a surface on the other core part to rock the latch to its locking position when the core parts are brought together. When the core parts are separated, the latch is biased to its released position thereby freeing the core part from the mold.

The core parts are connected to the other mold part by lost-motion connections provided by rods of different lengths which are slidable in bores provided in their respective cores. These connections are such that the core part engaging the latch is the first to be moved when the mold is opened. This part is thereby separated from the core part carrying the latch which is thereafter moved away from its associated mold part when the latch is released.

The rods also serve to actuate an ejecting ring prior to movement of the core parts when the mold is opened.

DESCRIPTION OF THE PREFERRED EMBODIMENT

Figure 1:
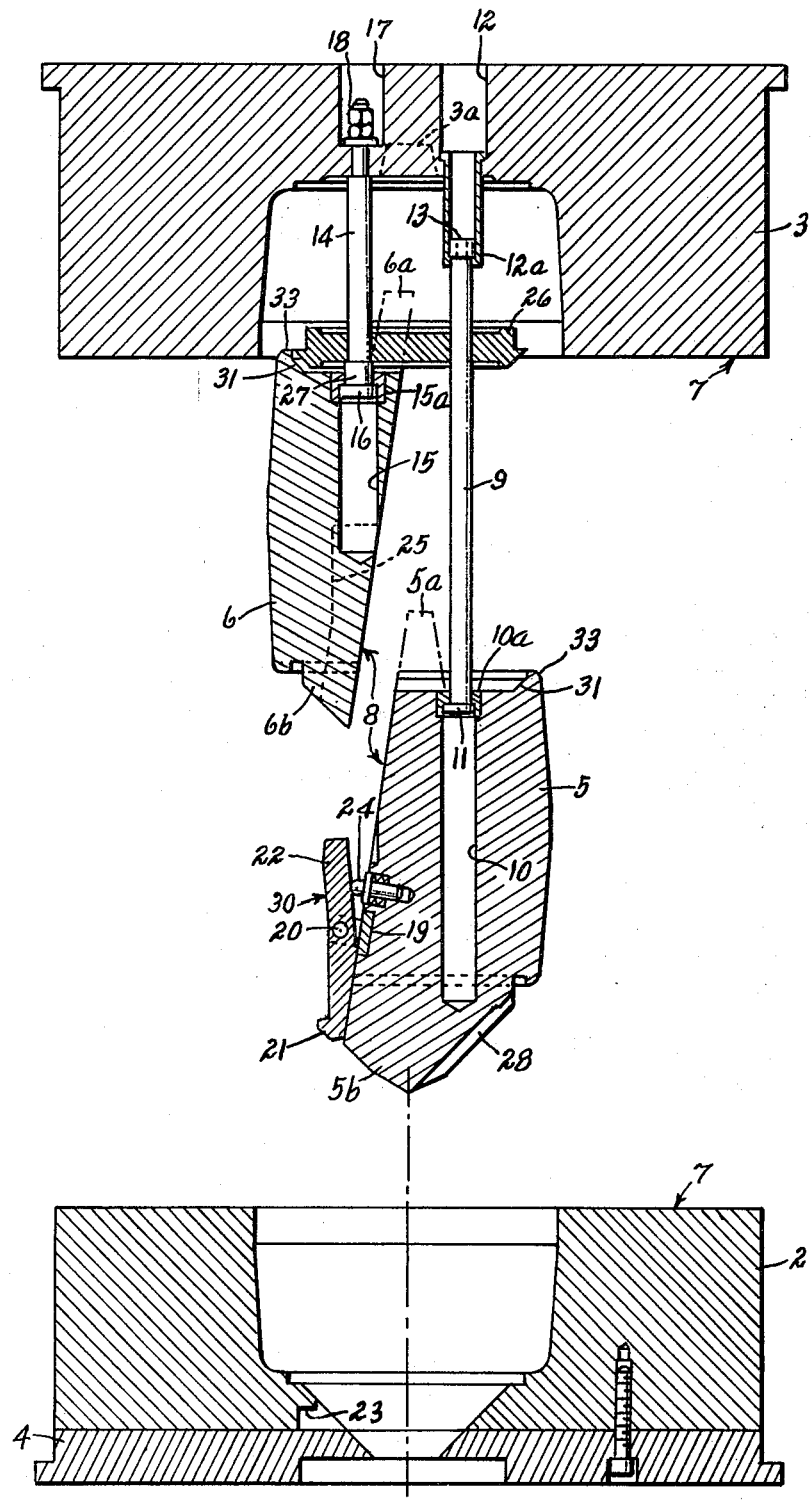
FIG. 1 is a cross-sectional view showing the parts in the positions they occupy when the mold is opened.

A suitable form of apparatus for carrying out the present invention is shown in the accompanying drawings in which a mold comprised of parts 2 and 3 is adapted to be mounted in a press of known construction. The part 2 may, for example, be secured to the fixed plate 4 of the press, while the part 3 may be secured to the movable plate thereof (not shown). Thereby, the mold may be opened or closed with the parts meeting along the line 7. within the mold cavity is a core comprised of two parts 5 and 6 which are adapted to meet along the line 8.

When the mold is closed, the core is held in a centered position within the cavity with the parts 5 and 6 in mating relation by conical locating surfaces 5a and 6a thereon which engage in a correspondingly shaped recess 3a formed in part 3 of the mold. Likewise, conical surfaces 5b and 6b formed on the opposite ends of parts 5 and 6 engage in a correspondingly shaped recess formed in part 2 of the mold to thereby hold the core parts firmly in place. thus, when rubber or other suitable molding material is forced into the mold through a channel 28, a molded article or body 29 will be formed in the space existing between the core and the mold.

The core parts 5 and 6 are attached to the part 3 of the mold by rods 9 and 14 are arranged to form a lost-motion connection between these parts. While only one rod 9 and one rod 14 is shown and described herein, it will be understood that two such rods would normally be provided. As shown in the drawings, a lug 11 is provided on the lower end of rod 9 and is adapted to slide in a bore 10 formed in the part 5. At its upper end each bore 10 is fitted with a bushing 10a which is sized to pass the rod 9 but not the lug 11. At its upper end, each rod 9 is fitted with a lug 13 which is slidable within a sleeve 12a received in a bore 12 in part 3 of the mold. Each sleeve 12a has an out-turned flange on its upper end and an in-turned flange on its lower end which flanges cooperate with corresponding shoulders formed in the bore 12 and on the lug 13, respectively. Thereby a telescoping joint is provided between the part 3 and the upper end of the rod. It will thus be seen that the lugs 11 and 13 on the rod 9 limit separation of the part 5 from the part 3 to the extent shown in FIG. 1.

The rod 14 similarly limits movement of the core part 6 to the extent shown in FIG. 1. For this purpose, the rod is provided with a lug 16 slidable within the bore 15 in the part 6. The upper end of the bore is fitted with a bushing 15a sized to pass a hub portion 27 on the lug 16 but not the lug itself. At its upper end, each rod is received in a counter-bored hole 17 in mold part 3 and is secured to the mold part by nuts 18 screwed onto the upper end of the rod.

Figure 2:
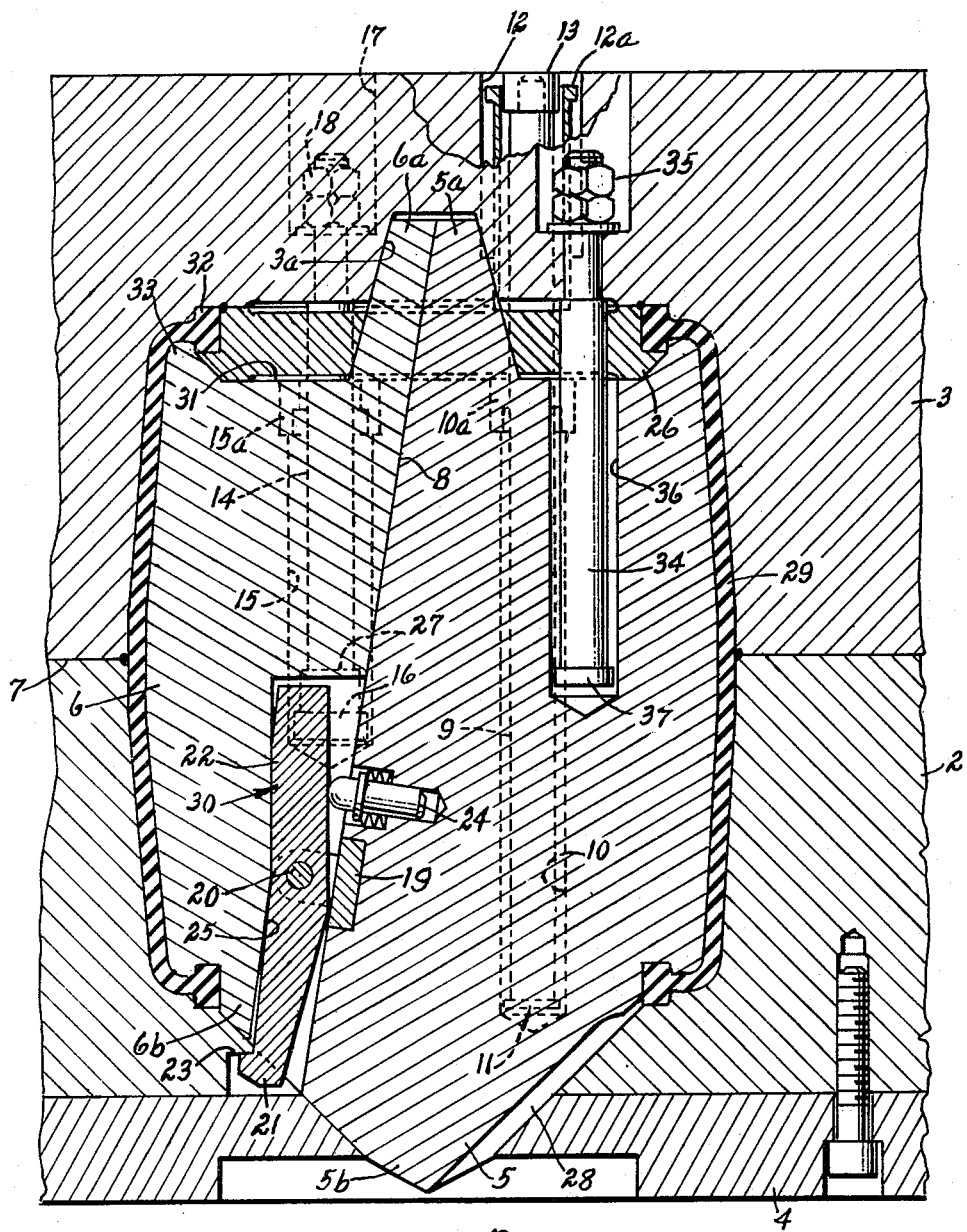
FIG. 2 is a cross-sectional view showing the positions of the parts when the mold is closed.

The core part 5 is arranged to be locked to the mold part 2 when the mold is closed. This is effected by a latch 30 pivoted at 20 on a bracket 19 secured to the part 5. The latch is provided with a hook 21 adapted to engage an abutment 23 formed on mold part 2 as shown in FIG. 2.

The latch is normally held in a disengaged position (FIG. 1) by a spring-pressed plunger 24 engaging against a tail 22 formed on the latch. However, when the core parts, 5 and 6 move into mating relation upon closing of the mold, the tail 22 is engaged by the bottom surface 25 of the groove in part 6 which constitutes a slanted ramp for camming the latch to its engaged position shown in FIG. 2.

The upper ends of the core parts 5 and 6 are provided with a hollowed-out area or recess 31 for receiving an ejecting ring 26. This ring is lifted during opening of the mold to dislodge the flange 32 of the body 29 from the lip 33 on the core and permit the part 6 to be stripped away from the body.

To lift the ring 26 from the recess 31, the hub 27 on rod 14 engages against the underside of the ring and lifts it a short distance before the lug 16 contacts the bushing 15a and lifts core part 6. A further pair of rods 34 (FIG. 2, only one shown) are secured to the mold part 3 by nuts 35 screwed onto the upper ends of the rods. Each of these rods is accommodated in a bore 36 formed in part 5 and is provided with a lug 37 which engages and lifts the ring 26 on opening of the mold.

After an article or body has been molded by injection of suitable molding material as indicated in FIG. 2, the press is opened to permit removal of the body from the mold. As the mold opens the part 3 will move away from the core which is locked to the part 2 by latch 30. Thereafter, the hubs 27 and lugs 37 will lift the ring 26 as shown in FIG. 1 and permit the part 6 to be stripped from the article 29 upon continued separation of parts 2 and 3. As part 6 moves away from part 5, the latch 30 will be released and permit part 5 to move out of the mold. After the parts have reached the positions shown in FIG. 1, the molded body 29 can be removed from the part 5 with but little effort since it is now completely clear of core part 6. The press is then ready to be closed in preparation for a succeeding molding operation. As the mold closes, the part 5 is first seated in the part 2 after which the part 6 engages the tail 22 and moves the latch 30 under abutment 23. The ring 26 is next lowered into the recess 31 and finally the part 3 moves down over the core and engages lugs 5a and 6a to center the core in the mold.

What is claimed is:

1. Apparatus for injection molding of open-ended hollow bodies comprising a mold having a parting plane perpendicular to the axis of symmetry of the mold and passing through the largest section of the mold between the two ends thereof so as to divide the mold into an upper part and a lower part, a core disposed within the mold and separated along a plane slanted with respect to the axis of symmetry thereof and dividing said core into a first part having a large base portion and a second part having a small base portion, and means adapted to be actuated by the mating of the core parts for locking the core part having the large base portion to the lower mold part, said locking means including a latch pivoted on said first core part, a groove in said second core part having a slanted bottom portion, and a tail on said latch constructed and arranged for engagement with the bottom portion of said groove for moving said latch to its engaged position when the mold is closed thereby locking said first core part to said lower mold part.

2. The molding apparatus of claim 1 including resilient means for biasing said latch to its disengaged position when said tail is released upon separation of the core parts.

3. The molding apparatus of claim 1 including a first lost-motion connection between said upper mold part and said second core part to permit said upper mold part to move through a predetermined distance relative to said second core part before engaging said second core part and moving it away from said first core part.

4. The molding apparatus of claim 3 including a second lost-motion connection between said upper mold part and said first core part which has greater freedom of movement than said first lost-motion connection and permits separation of said core parts and unlocking of said first core part before moving said first core part away from said lower mold part.

5. The molding apparatus of claim 3 including an ejecting member, and lost-motion means connecting said member with said upper mold part for moving said member relative to said core parts prior to the separation thereof upon opening of said mold.

* * * * *